(12) United States Patent
Smith et al.

(10) Patent No.: US 11,554,822 B2
(45) Date of Patent: Jan. 17, 2023

(54) ENDLESS TRACK SYSTEM SUSPENSION (71) Applicant: AGCO Corporation, Duluth, GA (US)

(72) Inventors: Evan Thomas Smith, Spirit Lake, IA (US); Alan D. Gustafson, Lakefield, MN (US); Derek D. Hruska, Lime Springs, IA (US)

(73) Assignee: AGCO CORPORATION, Duluth, GA (US)

( * ) Notice: Subject to any disclaimer, the term of this patent is extended or adjusted under 35 U.S.C. 154(b) by 150 days.

(21) Appl. No.: 16/681,259

(22) Filed: Nov. 12, 2019

(65) Prior Publication Data

US 2020/0148290 A1 May 14, 2020

Related U.S. Application Data

(60) Provisional application No. 62/760,662, filed on Nov. 13, 2018.

(51) Int. Cl.
 *B62D 55/084* (2006.01)
 *B62D 55/10* (2006.01)
 (Continued)

(52) U.S. Cl.
 CPC .......... *B62D 55/084* (2013.01); *B62D 55/10* (2013.01); *B62D 55/104* (2013.01);
 (Continued)

(58) Field of Classification Search
 CPC .. B62D 55/084; B62D 55/112; B62D 55/108; B62D 55/104; B62D 55/10; B62D 55/14
 See application file for complete search history.

(56) References Cited

U.S. PATENT DOCUMENTS

| 1,744,229 A | 1/1930 | Knox |
| 2,386,620 A | 10/1945 | Graham |

(Continued)

FOREIGN PATENT DOCUMENTS

| CA | 2735095 A1 | 9/2012 |
| EP | 2 921 378 A2 | 9/2015 |

(Continued)

OTHER PUBLICATIONS

European Patent Office, Search Report for related EP Application No. 19192250.9, dated Apr. 3, 2020.

(Continued)

*Primary Examiner* — Jacob D Knutson
*Assistant Examiner* — Abigail R Hymel (57) ABSTRACT

An undercarriage assembly for a work machine including a drive wheel; front and rear idler wheels; an endless track belt about the drive and idler wheels; mid-rollers located between the front and rear idler wheels to engage the endless track belt; a track roller frame mounted on the machine at a main pivot, between front and rear ends of an elongate member, with the front idler wheel connected near the front end of the roller frame; a major bogie connected to the roller frame at a major bogie pivot, and the rear idler wheel connected to a trailing arm of the major bogie; a minor bogie, mounted on a forward arm of the major bogie, and pivotably connected to the major bogie at a minor bogie pivot, and including front and rear axles, supported by a suspension that provides damping between the front and rear axles and the minor bogie pivot.

8 Claims, 7 Drawing Sheets

(51) Int. Cl.
  *B62D 55/14*  (2006.01)
  *B62D 55/104* (2006.01)
  *B62D 55/108* (2006.01)
  *B62D 55/112* (2006.01)

(52) U.S. Cl.
  CPC .......... *B62D 55/108* (2013.01); *B62D 55/112* (2013.01); *B62D 55/14* (2013.01)

(56) References Cited

U.S. PATENT DOCUMENTS

| | | | |
|---|---|---|---|
| 3,285,676 A | | 11/1966 | Hetteen |
| 3,790,230 A | * | 2/1974 | Jespersen ............ B62D 55/1083 305/125 |
| 5,340,205 A | * | 8/1994 | Nagorcka ............ B62D 55/104 305/132 |
| 9,505,454 B1 | | 11/2016 | Kautsch |
| 2004/0099451 A1 | | 5/2004 | Nagorcka et al. |
| 2012/0242141 A1 | * | 9/2012 | Bessette ............... B62D 55/084 305/142 |
| 2017/0129557 A1 | | 5/2017 | Gustafson |
| 2017/0210436 A1 | * | 7/2017 | Brazier .................. B62D 55/10 |
| 2018/0022408 A1 | * | 1/2018 | Sauvageau ........... B62D 55/096 305/142 |

FOREIGN PATENT DOCUMENTS

| | | |
|---|---|---|
| JP | 2010149860 A | 7/2010 |
| WO | 2017/078980 A1 | 5/2017 |

OTHER PUBLICATIONS

UK Intellectual Property Office, Search Report for related UK Application No. GB1819840.8, dated May 30, 2019.

\* cited by examiner

ENDLESS TRACK SYSTEM SUSPENSION

BACKGROUND

Field of the Invention

The present invention relates generally to an undercarriage of an endless track work machine and more particularly to an undercarriage having multiple degrees of motion freedom and a sprung minor bogie to distribute the weight of the machine and improve vehicle ride quality.

Description of Related Art

A typical tracked work machine utilizes a propulsion system in which a continuous flexible belt is frictionally driven as it is entrained about a main drive wheel and at least one idler wheel. The work machines are configured to maintain adequate tension on the endless belt around the entrained wheels, and to keep the belt in lateral alignment with the wheels when the wheels are subject to large lateral loads.

Tracked work machines utilize multiple track mid-rollers to distribute the vehicle's weight within the track and to help constrain the track from sliding off the wheels laterally. The main drive wheel drives the endless track belt which propels the vehicle.

Various suspension systems for tracked work vehicles have been developed. Track rollers help distribute the load of the vehicle on the track. In a rigid suspension system, the track rollers are directly mounted to a track frame and loads imparted to the track rollers are directly transferred to the track frame. In an active suspension system, the track frame is provided with a means for dampening the loads imparted to the track rollers which more evenly distributes the load as the tracks encounter obstacles.

In a typical single bogie, oscillating track suspension system used on some combine harvesters, there are two horizontal axes to permit the end idler wheels and mid-rollers to oscillate within the track system. The track roller frame is able to oscillate about a main pivot and the mid-rollers can oscillate about the bogie pivot. However, in such a design, as the system encounters an obstacle, the work vehicle will rise up approximately one-half the height of the obstacle and the mid-rollers will lose contact with the ground. Furthermore, when past the front idler wheel the obstacle may be under the mid rollers which are conventionally rigidly attached to a minor bogie, which is rigidly attached to a track frame. The obstacle causes the mid rollers to rise and imparts the impetus imparted to the track suspension system through to the aforementioned track frame. This can lead to an uneven ride quality and harsh inputs from the front and rear idler wheels.

SUMMARY OF THE INVENTION

Accordingly, there is provided an undercarriage assembly for a work machine, the undercarriage assembly comprising: a drive wheel; a front idler wheel rotatable on a front axle; a rear idler wheel rotatable on a rear axle; an endless track belt disposed about the drive and idler wheels; a plurality of mid-rollers located between the front and rear idler wheels and configured to engage the endless track belt on a lower run thereof; a track roller frame pivotably mounted on the work machine at a main pivot, the track roller frame comprising an elongate member with a front end and a rear end with the main pivot located between the front end and the rear end and the front idler wheel being connected near the front end of the track roller frame; a major bogie comprising a forward bogie arm and a trailing bogie arm, the major bogie being pivotably connected to the track roller frame at a major bogie pivot, wherein the rear idler wheel is connected to the trailing bogie arm; a minor bogie, mounted on the forward bogie arm, the minor bogie being pivotably connected to the major bogie at a minor bogie pivot, and wherein the minor bogie includes a minor bogie suspension, a minor bogie front axle, a minor bogie rear axle, the minor bogie front and rear axles being supported by the minor bogie suspension, and the said minor bogie suspension provides damping between the minor bogie front and rear axles and the minor bogie pivot.

Providing a suspension system on the minor bogie allows the track belt to better conform to contours and obstacles which the track belt may encounter in use. Furthermore, the minor bogie damps harsh inputs that may otherwise be transferred from the minor bogie to the major bogie and ultimately to a vehicle cab when in use. This provides for a smoother ride for the operator of a work machine that uses the undercarriage assembly.

Advantageously, the minor bogie suspension may comprise a resilient member and the front and rear minor bogie axles may be supported solely by the resilient member.

Supporting the minor bogie axles solely by the resilient member reduces component count of the minor bogie thereby reducing manufacturing costs and system complexity. The resilient member e.g. a leaf spring, can perform the function of both a frame to support the minor bogie axles and thus mid-rollers relative to the minor bogie pivot, and as the suspension system.

Advantageously, the minor bogie suspension may further comprise a resilient member and a minor bogie frame. The minor bogie frame may support the front and rear minor bogie axles, and the resilient member may be connected to both the minor bogie frame to the minor bogie pivot thereby increasing the system stability and robustness.

Including a minor bogie frame in addition to a suspension (resilient) member allows the suspension system to be better tuned for specific terrains and allows a greater range of suspension geometries.

Advantageously, the resilient member may be a leaf spring. In other aspects of the invention, the resilient member may be a hydraulic strut, or a coil spring.

The invention can utilise a variety of resilient members and known dampers to allow the suspension system to be tailored for specific design requirements.

Advantageously, an agricultural machine may include the undercarriage assembly.

Including the undercarriage on a work machine provides for better machine traction and improved ride comfort for an operator of the said machine.

These and other features and advantages of this invention are described in, or are apparent from, the following detailed description of various exemplary embodiments of the systems and methods according to this invention.

BRIEF DESCRIPTION OF THE DRAWINGS

Embodiments of the invention will now be described, by way of example only, with reference to the accompanying drawings, in which.

The drawings are provided by way of reference only, and will be acknowledged as not necessarily to scale.

DETAILED DESCRIPTION OF THE INVENTION

Aspects of the invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

Figure 1:
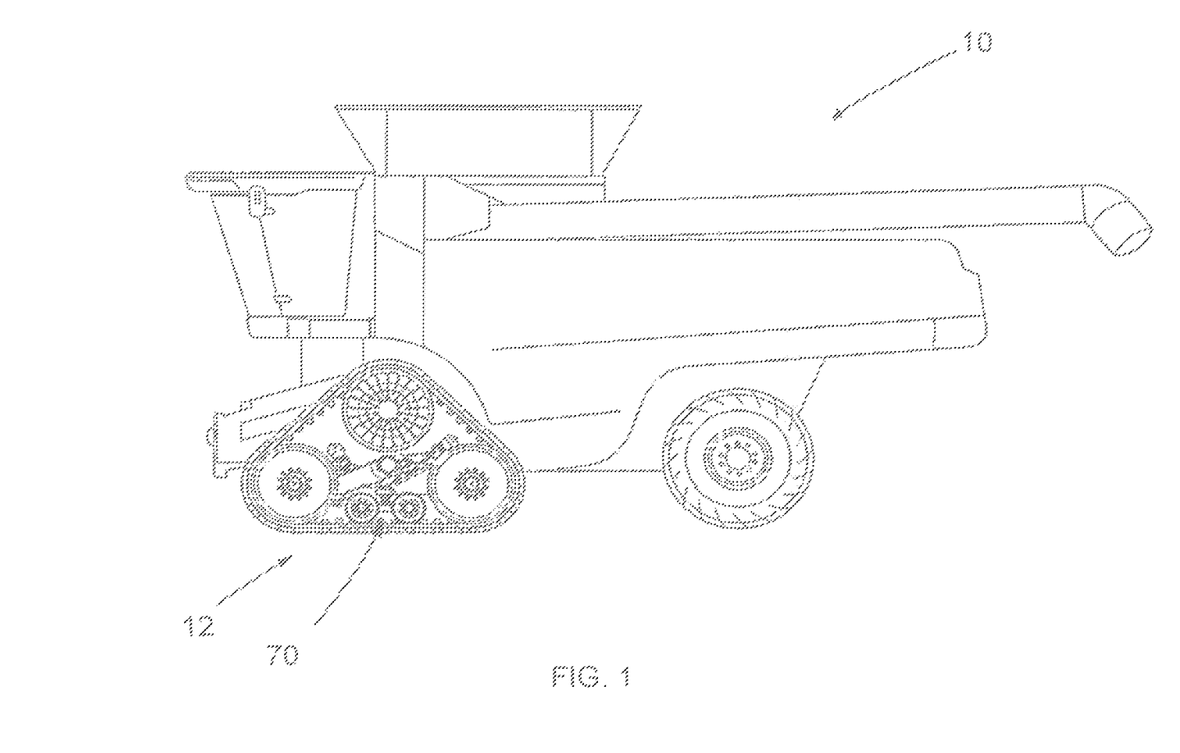
FIG. 1 is a side elevation of a work machine including the undercarriage assembly according to the invention.
Figure 2:
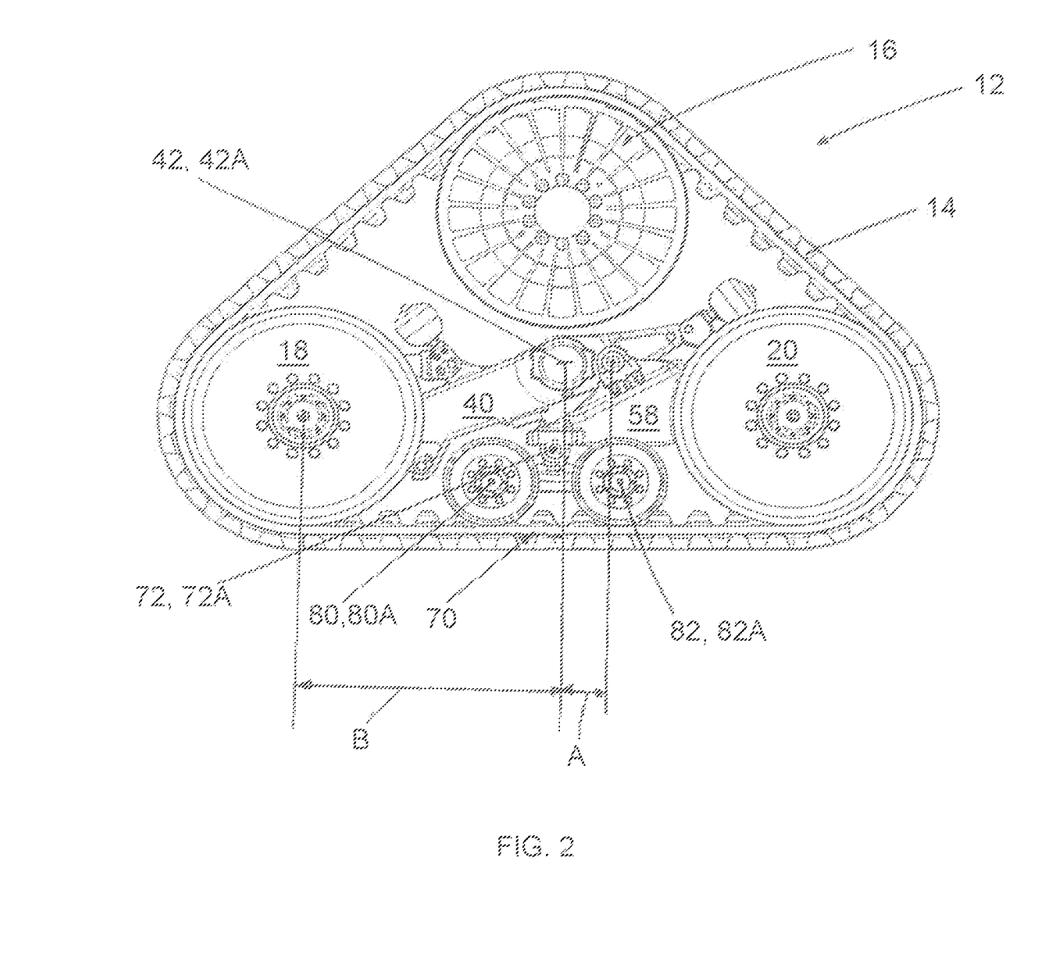
FIG. 2 is a side elevation of the undercarriage assembly of FIG. 1.
Figure 3:
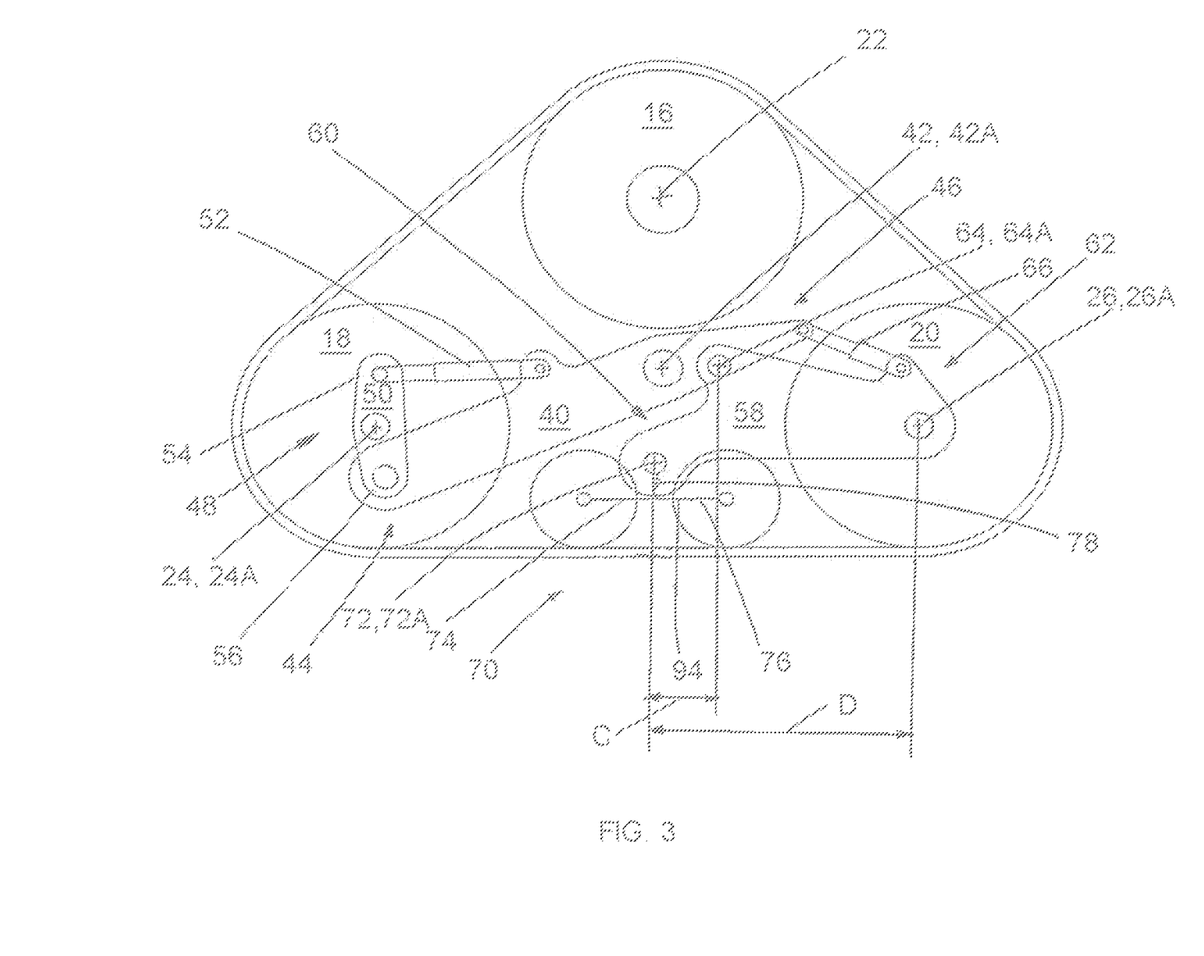
FIG. 3 is a schematic of the undercarriage assembly of FIG. 1.

FIG. 1 illustrates a work machine 10 having an exemplary tracked undercarriage assembly 12 configured to drive the work machine over ground. In one embodiment, the work machine 10 with the tracked undercarriage assembly 12 is an agricultural combine harvester, for which it is particularly well suited, however the present invention may be used on a variety of tracked vehicles and should only be limited by the claims that follow. The tracked undercarriage assembly 12 includes an endless track belt 14, preferably made of an elastomeric material such as rubber, entrained about a drive wheel 16, a front or first idler wheel 18, and a rear or second idler wheel 20. The drive wheel is rotatable on a drive axle 22 driven by a propulsion system (not shown) of the work machine as would be understood by one skilled in the art. The front and rear idler wheels 18, 20 are rotatable on front and rear axles 24, 26, respectively, that define front and rear idler axes 24A, 26A. The drive wheel 16 and the idler wheels 18, 20 are maintained in spaced apart relation by an undercarriage assembly which is connected to a chassis (not shown) of the work machine 10 in a conventional manner. In one embodiment, as is known in the art, the endless track belt 14 is provided with centering guide lugs (not shown) that engage the main drive wheel 16 to drive the track belt 14 and thereby propel the work vehicle 10.

Located between the idler wheels 18, 20 is a plurality of supporting mid-rollers 30. The endless track belt 14 is tensioned around the drive wheel 16, the idler wheels 18, 20 and is in contact with the mid-rollers 30 on a lower run thereof. The idler wheels 18, 20 and mid-rollers 30 are arranged on undercarriage assembly 12 as will be set forth herein.

The undercarriage assembly 12 includes a track roller frame 40 pivotably mounted to the chassis of the work machine 10 with a main pivot 42 defining a main pivot axis 42A. In the illustrated embodiment, the track roller frame 40 is an elongate member with a front end 44 and a rear end 46 with the main pivot 42 located between the front end 44 and the rear end 46. The front idler wheel 18 is rotatably connected near the front end 44 of the track roller frame 40 with a tensioning assembly 48 that allows controlling the tension of the belt 14, as well known in the art.

In the illustrated embodiment, the tensioning assembly 48 comprises a front arm 50 mounting the front axle 24 with a hydraulic cylinder 52 attached to a first end 54 of the arm 50 and a second end 56 of the arm pivotably coupled to the front end 44 of the track roller frame 40.

However, one skilled in the art will understand that other means may be used to connect the front axle 24 to the track roller frame 40 and tension the belt 14 using sound engineering judgment.

A major bogie 58 is pivotably connected to the track roller frame 40 includes a forward bogie arm 60 and a trailing bogie arm 62 and is pivotably connected to the track roller frame 40 at a major bogie pivot 64 defining a major bogie pivot axis 64A. The rear idler wheel 20 is rotatably connected to the trailing bogie arm 62 of the major bogie 58.

A minor bogie 70 is pivotably mounted on the forward bogie arm 60. The minor bogie 70 is pivotably connected to the major bogie 58 at a minor bogie pivot 72 defining a minor bogie pivot axis 72A. A first of the plurality of mid-rollers 30 is mounted on a front arm 74 of the minor bogie 70 and a second of the plurality of mid-rollers 30 is mounted on a rear arm 76 of the minor bogie 70. One skilled in the art will understand that additional mid-rollers 30 may be mounted on the minor bogie 70 between the first mid-roller 30 on the front arm 74 and the last mid-roller 30 on the rear arm 76.

The minor bogie 70 includes a suspension system known as the minor bogie suspension 78. The minor bogie suspension 78 permits the minor bogie 70 to move closer to and further away from the minor bogie pivot axis 72A as well as permitting rotational movement of the minor bogie 70 about the minor bogie pivot axis 72A.

A suspension cylinder 66 is connected between the rear end 46 of the track roller frame 40 and the trailing bogie arm 62 of the major bogie 58. The suspension cylinder 66 provides an offsetting force that produces a similar weight distribution under all the mid-rollers 30. Varying the amount of force of the suspension cylinder 66 provides a method to adjust weight distribution. The suspension cylinder 66 is also capable of providing a dampening effect to further improve the ride of the work vehicle 10.

The pivot axes 42A, 64A and 72A are arranged to create lever ratios within the undercarriage assembly 12 that produce a slightly higher percentage of weight distribution under the mid-rollers 30 than under the front and rear idler wheels 18, 20.

According to the invention, the major bogie pivot 64 is offset from the main pivot 42 along the track roller frame 40 such that the major bogie pivot 64 is at a location between the main pivot 42 and the rear end 46 of the track roller frame 40.

Desirably, a longitudinal distance A between the main pivot axis 42A and the major bogie pivot axis 64A is about 15-25% of a distance B between the front idler axis 24A and the main pivot axis 42A. Desirably, a longitudinal distance C between the minor bogie pivot axis 72A and the major bogie pivot axis 64A is about 20-30% of a distance D between the minor bogie pivot axis 72A and the rear idler axis 26A.

Figure 5:
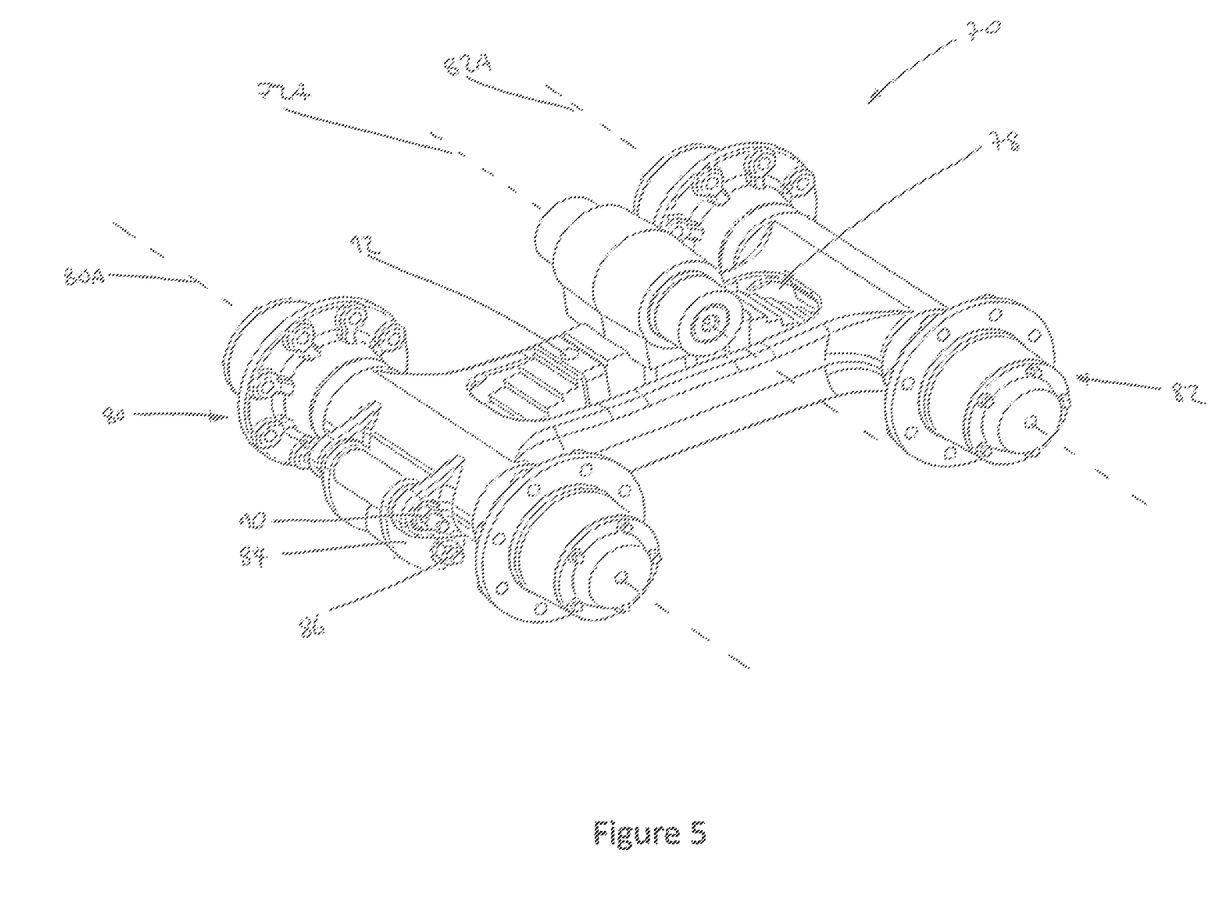
FIG. 5 is a perspective view of a minor bogie of the undercarriage assembly.
Figure 6:
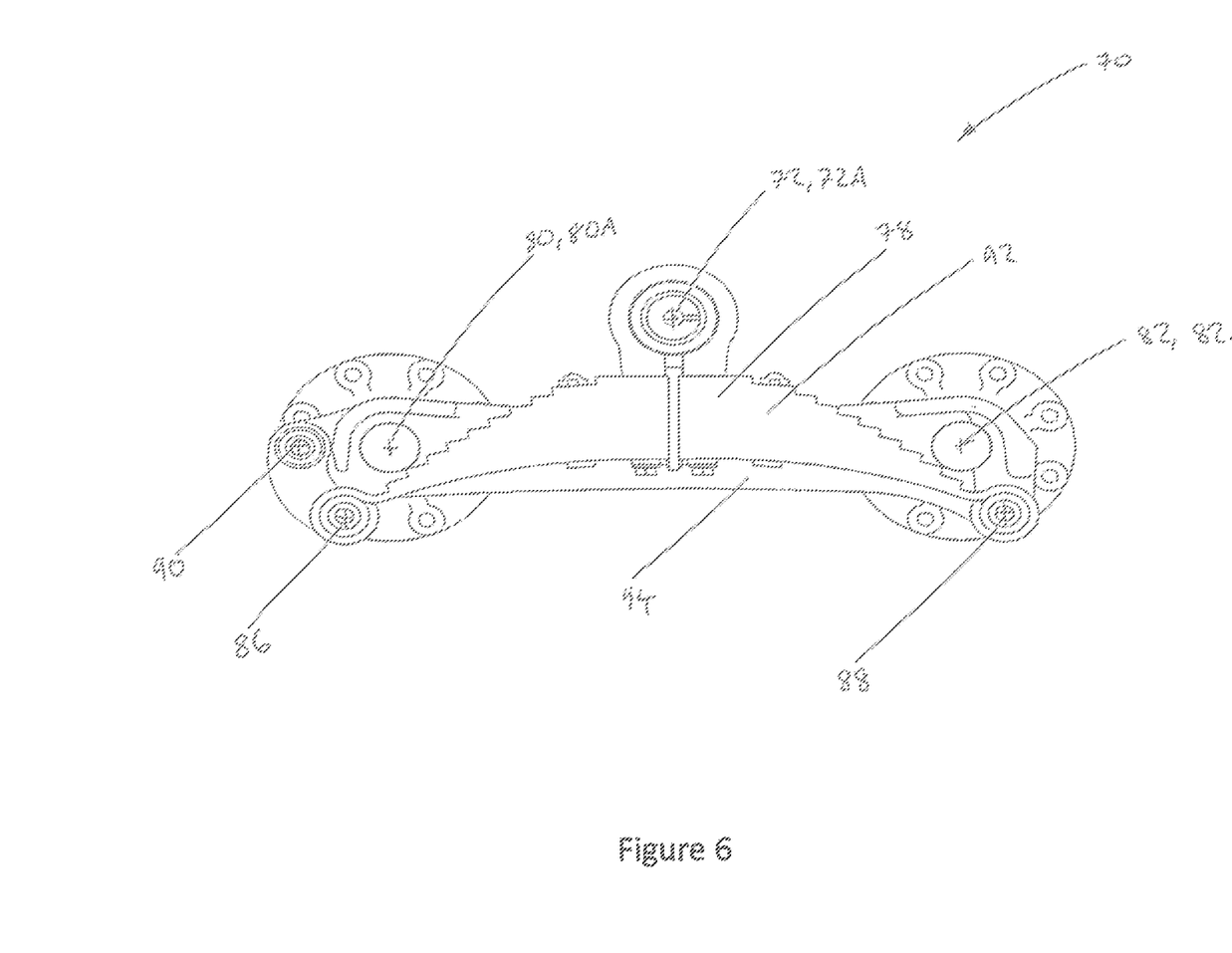
FIG. 6 is a sectioned side elevation of the minor bogie of FIG. 5.

With reference to FIGS. 5 and 6, alternative aspects of the aforementioned minor bogie 70 which includes the minor bogie suspension system 78 are shown.

In the example shown in FIGS. 5 and 6, the minor bogie 70 includes a separate suspension and frame construction. The minor bogie includes minor bogie front axle 80 which defines a minor bogie front axle axis 80A, a minor bogie rear axle 82 which defines a minor bogie rear axle axis 82A, a minor bogie suspension link 84, a resilient member such as a leaf spring 92 and a minor bogie frame 94.

The leaf spring 92 is attached to the minor bogie frame 94 at a rear suspension pivot 88 and to the minor bogie suspension link 84 at a front suspension pivot 86. The minor bogie suspension link 84 is attached to the minor bogie frame 92 at a link pivot 90.

Figure 7:
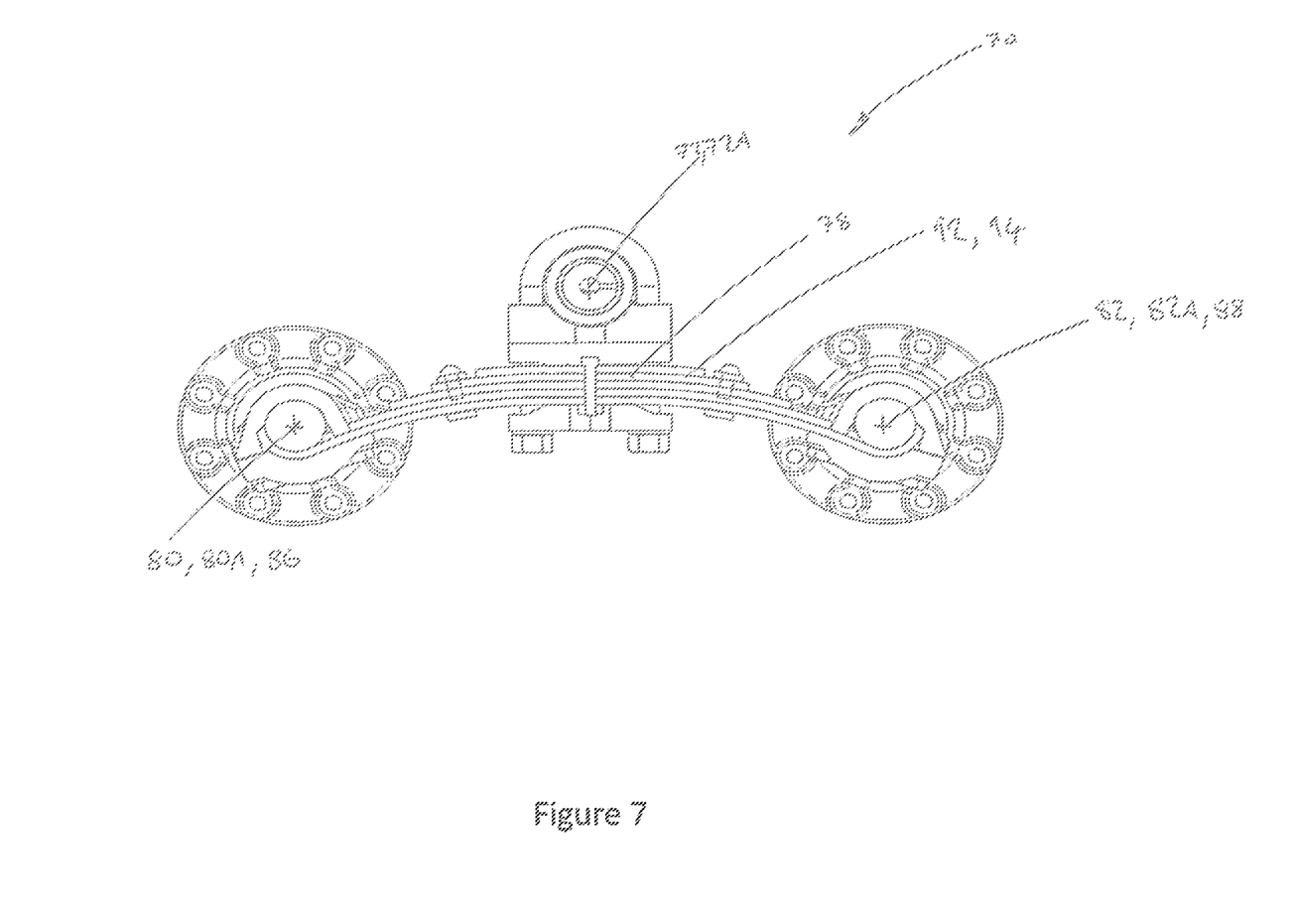
FIG. 7 is a side elevation an alternative minor bogie of the undercarriage assembly.

In the alternative example shown in FIG. 7, the leaf spring 92 has a dual function, the leaf spring 92 is the minor bogie suspension 78 and the minor bogie frame 94. This cart style suspension system permits movement of the minor bogie front axle axis 80A and the minor bogie rear axle axis 82A to change proximity to the minor bogie pivot axis 72A whilst the minor bogie suspension 78 damps this relative motion when in use.

It will be understood that other types of suspension systems or resilient members which permit temporary displacement of a component could be used for the minor bogie suspension, such as, replacing the leaf spring 92 with hydraulic rams or a coil spring type arrangement between the minor bogie frame 94 and the minor bogie pivot 72.

Furthermore, drive could be transmitted to the undercarriage assembly 12 from the front and or rear idler wheels 18, 20 instead of the via the drive wheel 16.

In previous designs, as the work vehicle 10 encounters an obstacle in the field, the work vehicle would raise up approximately one-half the height of the obstacle. With the additional motion provided by the addition of the major bogie 58 in the undercarriage assembly 12, the vertical motion is reduced providing a more stable ride.

Figure 4:
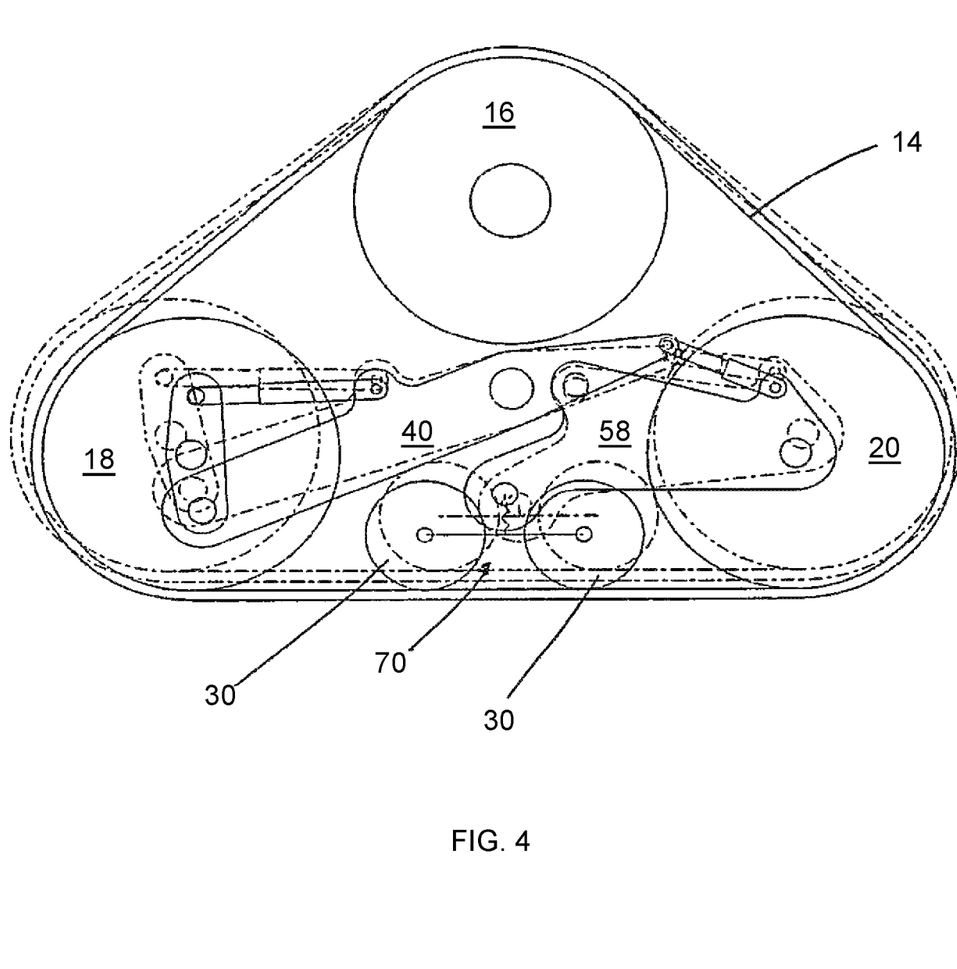
FIG. 4 is a schematic of the undercarriage assembly of FIG. 1 illustrating how the undercarriage assembly geometry may change when in use.

FIG. 4 provides an indication of the ability of the undercarriage assembly 12 to alter geometry from the solid line position to the broken line position when an obstacle is encountered thereby allowing the undercarriage assembly 12 to better follow uneven terrain and provide a less harsh ride to the work machine 10.

The aforementioned layout improves ride comfort, and helps the track system maintain contact with the ground for improved stability and reduced compaction. Through deflection, the leaf spring 92 or other suspension component will absorb harsh inputs that would normally be transmitted into the track frame from the bogie wheels traveling over uneven terrain. Additionally, the manner in which the two frame sections are allowed to pivot about each other, and the bogie wheel system allows for the leaf spring 92 to absorb harsh inputs from both the front and rear idler wheels 18, 20.

The undercarriage assembly 12 may consist of a multi-piece track roller frame assembly with a leaf spring connecting the bogie wheels to the rest of the track frame. The entire track frame may be connected to the vehicle's chassis through a main pivot pin that allows the track frame to oscillate in relation the rest of the vehicle. The front frame section of the track roller frame houses the main pivot pin, and may be connected to a swing link which pushes the front idler wheels forward through a hydraulic ram to keep the track belt taut. At the rear of the front frame section there may be a pivot pin, known as the major bogie pin, which connects the front and rear frame sections together, but allows them to oscillate. There may also be a hydraulic ram connecting the two frame sections to help dampen the movement between the two sections. At the back of the rear frame section there may be a set of idler wheels, and at the front of the rear frame section may be another pin called the minor bogie pin. The minor bogie pin is used to connect the bogie wheels to the rear frame section, and it allows the bogie wheels to oscillate in relation to the rear frame section. The two sets of bogie wheels may be connected to one another through a bogie wheel frame. Between the bogie wheel frame and minor bogie pin there may be a leaf spring assembly. The minor bogie pin may be attached to the centre portion of the leaf spring, and the leaf spring may be attached to the bogie wheel frame through leaf eye bushings and a shackle at one end.

The foregoing has broadly outlined some of the more pertinent aspects and features of the present invention. These should be construed to be merely illustrative of some of the more prominent features and applications of the invention.

Other beneficial results can be obtained by applying the disclosed information in a different manner or by modifying the disclosed embodiments. Accordingly, other aspects and a more comprehensive understanding of the invention may be obtained by referring to the detailed description of the exemplary embodiments taken in conjunction with the accompanying drawings.

The invention is not limited to the embodiments or examples described herein, and may be modified or adapted without departing from the scope of the present invention.

The invention claimed is:

1. An undercarriage assembly for a work machine, the undercarriage assembly comprising:
   a drive wheel;
   a front idler wheel rotatable on a front axle;
   a rear idler wheel rotatable on a rear axle;
   an endless track belt disposed about the drive and idler wheels;
   a plurality of mid-rollers located between the front and rear idler wheels and configured to engage the endless track belt on a lower run thereof;
   a track roller frame pivotably mounted on the work machine at a main pivot, the track roller frame comprising an elongate member with a front end and a rear end with the main pivot located between the front end and the rear end and the front idler wheel being connected near the front end of the track roller frame;
   a rigid major bogie, comprising a forward bogie arm and a trailing bogie arm, the major bogie being pivotably connected to the track roller frame at a major bogie pivot, wherein the rear idler wheel is connected to the trailing bogie arm;
   a minor bogie, mounted on the forward bogie arm, the minor bogie comprising a rigid frame, wherein the minor bogie is pivotably connected to the major bogie at a minor bogie pivot, and wherein the minor bogie further comprises minor bogie suspension, a minor bogie front axle, and a minor bogie rear axle, the minor bogie front and rear axles being supported by the minor bogie frame, wherein the minor bogie suspension provides damping between the minor bogie frame and the minor bogie pivot.

2. The undercarriage assembly according to claim 1, wherein the minor bogie suspension comprises a resilient member, and wherein the front and rear minor bogie axles are supported solely by the resilient member.

3. The undercarriage assembly according to claim 1, wherein the minor bogie suspension further comprises a resilient member and a minor bogie frame, wherein the minor bogie frame supports the front and rear minor bogie axles, and the resilient member is connected to both the minor bogie frame and to the minor bogie pivot.

4. The undercarriage assembly according to claim 3, wherein the resilient member is a leaf spring.

5. The undercarriage assembly according to claim 4, wherein the resilient member is connected to the minor bogie frame via a suspension link at the minor bogie front axle.

6. An agricultural machine including the undercarriage assembly of claim 3.

7. An undercarriage assembly for a work machine, the undercarriage assembly comprising:
- a drive wheel;
- a front idler wheel rotatable on a front axle;
- a rear idler wheel rotatable on a rear axle;
- an endless track belt disposed about the drive and idler wheels;
- a plurality of mid-rollers located between the front and rear idler wheels and configured to engage the endless track belt on a lower run thereof;
- a track roller frame pivotably mounted on the work machine at a main pivot, the track roller frame comprising an elongate member with a front end and a rear end with the main pivot located between the front end and the rear end and the front idler wheel being connected near the front end of the track roller frame;
- a major bogie comprising a forward bogie arm and a trailing bogie arm, the major bogie being pivotably connected to the track roller frame at a major bogie pivot, wherein the rear idler wheel is connected to the trailing bogie arm;
- a minor bogie, mounted on the forward bogie arm, the minor bogie being pivotably connected to the major bogie at a minor bogie pivot, wherein the minor bogie comprises a minor bogie frame which supports a minor bogie front axle and a minor bogie rear axle, the minor bogie front and rear axles each supporting mid-rollers, the minor bogie frame being connected to the minor bogie pivot by a leaf spring, the leaf spring having a front end connected to a front end of the minor bogie frame and a rear end connected to a rear end of the minor bogie frame, the leaf spring being connected to the minor bogie pivot at a position between the front and rear ends.

8. The undercarriage assembly of claim 7, wherein the front end of the leaf spring is connected to the front end of the minor bogie frame by a minor bogie suspension link, the minor bogie suspension link pivotably connected to the front end of the minor bogie frame and to the front end of the leaf spring.

* * * * *